US007866856B2

(12) United States Patent
Hundhammer et al.

(10) Patent No.: US 7,866,856 B2
(45) Date of Patent: Jan. 11, 2011

(54) LAMP HOUSING, PARTICULARLY SPOTLIGHT HOUSING

(75) Inventors: Anton Hundhammer, Söchtenau (DE); Klaus-Dieter Stegmaier, Viechtach (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 401 days.

(21) Appl. No.: 11/988,635

(22) PCT Filed: Jul. 13, 2006

(86) PCT No.: PCT/EP2006/006876

§ 371 (c)(1), (2), (4) Date: Mar. 4, 2008

(87) PCT Pub. No.: WO2007/006578

PCT Pub. Date: Jan. 18, 2007

(65) Prior Publication Data

US 2009/0040773 A1 Feb. 12, 2009

(30) Foreign Application Priority Data

Jul. 13, 2005 (DE) .................. 20 2005 011 416 U

(51) Int. Cl.
*B60Q 1/06* (2006.01)

(52) U.S. Cl. ....................... 362/371; 362/362; 362/368; 362/370; 362/418

(58) Field of Classification Search ................. 362/362, 362/368, 370–371, 418, 429–430
See application file for complete search history.

(56) References Cited

U.S. PATENT DOCUMENTS 4,540,227 A 9/1985 Faraci (Continued)

FOREIGN PATENT DOCUMENTS

DE 198 16 364 A1 10/1999

(Continued)

OTHER PUBLICATIONS

International Search Report, dated Oct. 27, 2006, corresponding to PCT/EP2006/006876.

(Continued)

*Primary Examiner*—Sandra L O Shea
*Assistant Examiner*—Meghan K Dunwiddie
(74) *Attorney, Agent, or Firm*—Christie, Parker & Hale, LLP

(57) ABSTRACT

A lamp housing which contains an accommodating apparatus for a burner or a lamp with a glass vessel, a lamp base and contact pins for supplying current, and a lampholder with sockets for connection to the contact pins, is provided. The accommodating apparatus containing clamping jaws, which can be connected to the lamp base in a force-fitting and/or interlocking manner, engage at least partially around the lamp base, are articulated, via lever arms, on the lamp housing or a lampholder mount, which is fixed to the housing and is connected to the lamp housing, and can be adjusted by means of an adjusting device, which has at least one adjusting element, which is arranged between the lever arms and pushes the lever arms apart from one another for opening the clamping jaws into an opening position, in which the lamp base is released, and brings the lever arms together for closing the clamping jaws into a locking position, in which the lamp base is fixed.

30 Claims, 4 Drawing Sheets

U.S. PATENT DOCUMENTS

2004/0115979 A1 6/2004 Melzner et al.

FOREIGN PATENT DOCUMENTS

DE 198 16 364 C2 10/1999
DE 101 20 741 A1 10/2002

OTHER PUBLICATIONS

English translation of International Preliminary Examination Report for corresponding PCT application No. PCT/EP2006/006876, dated Jan. 29, 2008.

LAMP HOUSING, PARTICULARLY SPOTLIGHT HOUSING

CROSS-REFERENCE TO A RELATED APPLICATION

This application is a National Phase patent application of International Patent Application Number PCT/EP2006/006876, filed on Jul. 13, 2006, which claims priority of German Utility Model Application Number 20 2005 011 416.2, filed on Jul. 13, 2005.

BACKGROUND

The invention relates to a lamp housing, particularly a spotlight housing.

DE 198 16 364 C2 has disclosed a lamp housing, which is used for accommodating a luminous body, a transparent cover plate in the form of a protective plate or a lens plate and a reflector. Burners or lamps, preferably discharge lamps with a base at one end, with a vertical or horizontal installed position, i.e. in each case at right angles to the optical axis, or with an axial installed position, i.e. in the optical axis, are used as luminous bodies.

The lamps have a gas-filled glass body with electrodes arranged therein, a lamp base, through which the feed lines to the electrodes are passed, and two or more contact pins, which are arranged on that end of the lamp base which is opposite the glass body. The contact pins are inserted into the sockets of a lampholder connected to the lamp housing in order to connect the lamp to a voltage source, a tight fit between the sockets and the contact pins being necessary for the high current levels of the lamp current to be transmitted.

At the same time, the contact pins, for example of discharge lamps with a base at one end, are used as fastening means for the discharge lamp. Since, as lamp powers increase, also the physical size of the discharge lamps and in particular the physical length of the glass body and of the lamp base increase, the lamps in the case of relatively high lamp powers have such a physical size that, in particular in the case of a horizontal installed position of the discharge lamps, considerable forces are exerted on the contact pins which, in addition to supplying current, also act as fastening contacts.

These forces result in an impairment of the contact between the contact pins and the sockets of the lampholder, which is associated with increased transfer resistance when transmitting the lamp current, a displacement of the lamp from the focal point of the reflector and, as a result of this, a reduced luminous efficiency and with a transmission of the forces into the lamp interior, which may result in impermissible voltages and ultimately in failure of the lamp.

The disadvantages of mounting the lamp exclusively via the contact pins are not only noticeable in the steady-state range in terms of the physical size of the lamp, however, but in particular also in the dynamic range during transport of a spotlight or its operation with jerky pivoting movements, impacts on the lamp housing and the like.

In order to be able to use a lamp housing for lamps with different lamp base diameters without replacing an accommodating device and to be able to use the contact pins of the lamps exclusively for transmitting the lamp current, in the case of the lamp housing known from DE 198 16 364 C2 the accommodating device comprises clamping jaws, which engage around the lamp base and can be adjusted by means of the adjusting device into an opening position, in which the lamp base is released, and into a locking position, in which the lamp base is fixed. The adjusting device comprises a latch with two sloping faces, which are designed to be geometrically identical and bear against the upper and lower clamping jaw in such a way that, when the latch is adjusted, the clamping jaws are spread apart radially.

SUMMARY

The object of the present invention is to specify a lamp housing of the type mentioned at the outset which makes it possible to accommodate lamps with lamp base diameters which vary within a wide range and makes possible a range for various lamp base diameters which can be varied using simple means, which exerts a defined clamping force on the lamp base, has a compact design, prevents mechanical loading of the contact pins of the lamp, in which the lamps are automatically centered, and which ensures simple actuation when changing the lamp.

An exemplary solution according to an exemplary embodiment of the invention makes it possible to use lamps with lamp base diameters which vary within a wide range without any replacement of an accommodating device and without compensating for nominal dimensional deviations. As a result, the lamps are always optimally centralized in the lamp axis, as a result of which a maximum luminous efficiency is ensured. At the same time it is ensured that the contact pins of the lamp are used exclusively for transmitting the lamp current, without performing a holding and/or fastening function for the lamp. As a result of the action of the adjusting device on the lever arms of the clamping jaws, the range of lamps to be accommodated by the accommodating device can be set and changed using simple means, which ensures simple lamp replacement.

Owing to the arrangement of an adjusting element with parts which are arranged diametrically with respect to one another in relation to the adjusting spindle, a clamping force is produced which is defined by the distance between the parts. Since the adjusting element is capable of rotating about the adjusting spindle, the lamp housing may have a very compact design and can therefore be used in a very space-saving manner.

The fact that the adjusting element is separate from the adjusting spindle also makes it possible to set the range of the different lamp diameters to be accommodated by the accommodating device in a simple manner.

Exemplary, the adjusting spindle is connected to the adjusting element and an actuating element for the adjusting device for opening or closing the clamping jaws and extends at right angles to the longitudinal extent of the lever arms.

The fact that the adjusting spindle is connected to the adjusting element and an actuating element firstly ensures simple actuation from the side of the lamp housing with little expenditure of force given optimum detectability of the clamping region when a lamp is replaced and secondly makes a particularly compact design possible as a result of the direct connection between the adjusting element and the adjusting spindle.

The adjusting device exemplary pushes the lever arms, which are prestressed into the locking position of the clamping jaws, apart from one another counter to the prestress and brings them together in the direction of the prestress, so that a defined clamping force clamps in the lamp base. Alternatively, as a result of a suitable connection between the adjusting element and the lever arms, for example in the form of a slotted-link guide, the rotary movement of the adjusting element can be converted into a tongs-like movement of the lever arms, and possibly also latching-in in the locking position can be provided in addition so that the clamping-in force is not determined by the prestress of the lever arms, but by the small axial distance of the adjusting element.

In an exemplary embodiment of the invention, the adjusting element comprises at least one cam disk, which acts on the lever arms and has at least two axes of different lengths which are preferably at right angles with respect to one another, preferably comprises an ellipsoidal disk, which is mounted centrally between the lever arms and whose peripheral rim is supported on bearings, which are connected to or formed on the lever arms.

This configuration of the adjusting element makes it possible for the clamping jaws to open and close with little force expenditure and for the diameter range for the lamp to be accommodated to be fixed in a simple manner by the geometry of the cam disk or ellipsoidal disk, so that the clamping region of the accommodating apparatus can be determined simply by dimensioning the geometry of the cam disk or the large and small axis of the ellipsoidal disk.

The adjusting spindle can be connected to the cam disk or ellipsoidal disk either centrally or eccentrically, so that, when the adjusting spindle is running centrally between the lever arms, symmetrical opening of the clamping jaws in relation to the axis of symmetry takes place, whereas, when the adjusting spindle is running eccentrically between the lever arms, asymmetric opening of the clamping jaws takes place.

Exemplary, the bearings comprise bronze bearings, which are in the form of circular disks and are fastened to the lever arms in particular in such a way that they can rotate.

Designing the bearings as bronze bearings in the form of circular disks and fastening them to the lever arms in such a way that they can rotate ensures little frictional force for easy opening and closing of the clamping jaws, little wear and a high thermal resistance.

An exemplary embodiment of the adjusting element comprises a roller bearing, which acts on the lever arms, is capable of rotating about the adjusting spindle and preferably has at least two bearing rollers, which are spaced apart from one another, are arranged at the periphery of a roller mount, which is capable of rotating about the adjusting spindle, and, when the clamping jaws are open or closed, are supported on the lower or upper sides of the lever arms or on supports, which are formed on or connected to the lever arms.

This embodiment of the adjusting element represents a kinematic reversal of the adjusting element, which is in the form of a cam disk or ellipsoidal disk and bears against the supporting bearings, which are connected to the lever arms, and has a bearing element, which rotates about the adjusting spindle, while a smooth, rigid bearing surface is realized on the side of the lever arms, which bearing surface either comprises a tilted-out, angled metal sheet of the lever arms or consists of the fact that the bearing element runs between the upper and lower sides of the lever arms and is supported on the upper and lower sides.

In the simplest configuration, the roller bearing can have two bearing rollers, which are arranged diametrically with respect to one another at the ends of the roller mount, which is capable of rotating about the adjusting spindle, and bear against the lever arms, which are prestressed in the closing direction of the clamping jaws, when the clamping jaws are open.

In this embodiment, as a result of the rotation of the adjusting spindle, the bearing rollers are brought to bear against the lever arms and the latter are moved counter to a spring prestress so as to open the clamping jaws. As a result of a rotation of the adjusting spindle through 90°, for example, the lever arms are moved towards one another under the effect of the spring prestress and the clamping jaws are closed. Since an unstable position of the roller bearing is provided in the opening position of the clamping jaws, either a single-handed operation is required, in which the adjusting spindle is held in the opening position of the clamping jaws, or the adjusting spindle is connected to a corresponding latching apparatus with an opening and closing position.

In an alternative exemplary embodiment, the roller bearing comprises two supporting arms, which intersect one another at right angles and have different lengths and whose point of intersection is connected to the adjusting spindle, the bearing rollers, which are arranged at the ends of the longer supporting arm, pushing the lever arms apart from one another so as to open the clamping jaws, and the bearing rollers, which are arranged at the ends of the shorter supporting arm, bearing against the lever arms when the clamping jaws are closed.

In this embodiment, the roller bearing assumes two defined states, in which case in each case two mutually opposite bearing rollers bear against the lever arms. In this embodiment as well, the adjusting spindle can be connected to a latching or locking apparatus in an opening and closing position so as to secure the respective position.

A further exemplary alternative of the roller bearing comprises a roller mount, which is in the form of an equilateral triangle and at whose corners the bearing rollers are arranged. All three bearing rollers bear against the lever arms in the closing position of the clamping jaws, while two bearing rollers, which form the base of the equilateral triangle, bear against the lever arms in the opening position.

Exemplary, the actuating element for the adjusting device for opening or closing the clamping jaws has an adjusting lever or adjusting knob, which is arranged on the outside of the lamp housing, so that, using one hand, the clamping jaws can be brought into the opening position, possibly counter to a spring prestress acting in the closing direction of the clamping jaws, so as to release the lamp to be replaced and, with the other hand, the lamp can be withdrawn from the lampholder, a replacement lamp can be inserted into the lampholder and the replacement lamp is accommodated by the accommodating device as a result of adjustment of the adjusting lever or adjusting knob or as a result of the adjusting lever or adjusting knob being released when the clamping jaws are spring-loaded in the closing direction.

The actuating element can optionally be connected to an adjusting lever or adjusting knob, which is arranged on the outside of the lamp housing, in a depression of the lamp housing or within the lamp housing and is covered by a flap, for simple actuation of the adjusting device.

In an exemplary configuration according to an exemplary embodiment of the invention, the adjusting spindle or the actuating element is connected to a latching or locking device which secures the opening or closing position of the clamping jaws, so that the respective position of the clamping jaws can be identified and, in particular in the opening position of the clamping jaws, a secure position of the locking device is ensured.

In an exemplary embodiment of the invention, the lever arms are arranged on both sides of the lampholder and are connected at their front ends to a first and second clamping jaw, a cam disk or ellipsoidal disk being provided between the two lever arms, which are arranged on each side of the lampholder, which cam disks or ellipsoidal disks are preferably connected to the adjusting spindle, which is guided through the lampholder.

As a result of the arrangement of cam disks or ellipsoidal disks on both sides, the opening and closing movement is transmitted to both lever arms of the respective upper and lower clamping jaw, so that simple and reliable actuation without tilting and simple and safe centering are ensured.

In particular tension springs and/or compression springs are used for prestressing the clamping jaws in their closing position, either the upper and lower lever arms being braced with one another via tension springs, which are arranged in the region of the clamping jaws between the upper and lower lever arms, or the upper and lower clamping jaw and/or the upper and lower lever arms being connected to the lamp housing or to the lampholder mount, which is connected to the lamp housing, via compression springs.

Furthermore, the upper and lower lever arms can be mounted at their ends opposite the clamping jaws on bearing rods, which are guided transversely with respect to the longitudinal extent of the lever arms and are supported on the lamp housing or the lampholder mount, which is connected to the lamp housing.

As a result of the fact that the actuating element is connected to a device for opening and closing the socket contacts of the lampholder, the actuating element, with a dual function, can combine a release of the contact pins and the lamp base of the lamp with the simultaneous release and locking of the lamp by means of the clamping jaws.

As a result of the polygonal design of the clamping jaws with a preferably trapezoidal cutout from a rectangular surface, simple centering of the lamps within the accommodating device is ensured irrespective of the lamp diameter.

In accordance with a further feature of the invention, the clamping jaws can be spread apart from one another in the direction of gravitation upwards and downwards, so that, in the event of a lamp replacement, the lamp base is always supported by the respective lower clamping jaw. In this case, the geometry of the clamping jaws is such that a displacement compensation is produced between the upper and lower clamping jaw in order to compensate for the deviation of the lamp downwards brought about by the weight of the lamp and its lever action as a result of the elongate glass body.

A further exemplary configuration according to an exemplary embodiment of the invention is characterized by the fact that the clamping jaws accommodate the lamp base at an axial distance from one another, and the lampholder is supported on the lamp housing in a manner in which it is freely moveable.

The arrangement of a plurality of clamping jaws in the axial direction of the lamp base makes possible uniform support and retaining of the lamp and ensures that the contact pins, which are accommodated in the sockets of the lampholder, are free from any mounting forces. As a result of the fact that the lampholder is supported on the lamp housing in such a way that it is freely moveable in the manner of a “floating mounting”, it is ensured that no impact forces are transmitted to the glass body of the lamp and movement compensation is ensured.

In accordance with a further feature of the invention, the lampholder is connected in spring-elastic fashion to the lampholder mount, so that effective spring-elastic support on the lamp housing is ensured using simple means, and therefore the lamp is effectively protected from vibrations or sudden changes in direction of the lamp housing even in the case of a large physical length of the lamp.

BRIEF DESCRIPTION OF THE DRAWINGS

The basic concept of the invention will be explained in more detail with reference to an exemplary embodiment illustrated in the figures, in which.

DETAILED DESCRIPTION

Figure 1:
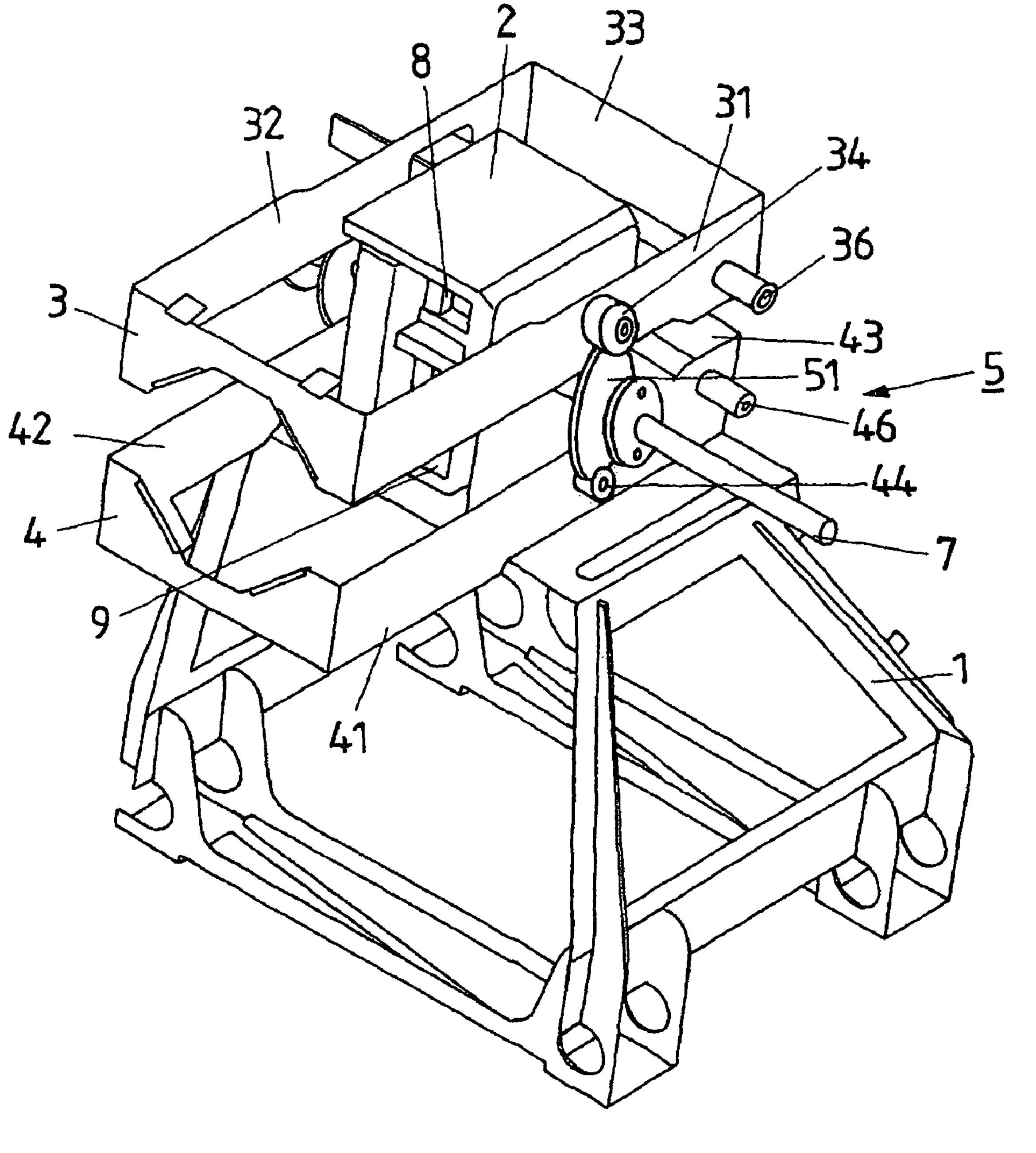
FIG. 1 shows a perspective illustration of an accommodating apparatus for a lamp with a lampholder mount, a lampholder, adjustable clamping jaws for accommodating a lamp base and an adjusting device for the clamping jaws.

FIG. 1 shows, in a perspective view, a lampholder mount 1, which is connected to the lamp housing (not illustrated in any more detail) for a spotlight via a spring-elastic bearing and accommodates a lampholder 2 with sockets 8, 9 for the current supply, into which sockets 8, 9 the contact pins of a lamp or a burner, in particular a discharge lamp, are inserted.

The lamp, which is not illustrated in any more detail, has an elongate, gas-filled glass body, a lamp base and the contact pins for connection to the sockets 8, 9 of the lampholder 2. As a result of the length of the glass body and its weight and the weight of the lamp base of the lamp, considerable forces, in particular dynamic forces in the case of a sudden change in direction of the lamp housing or impacts acting on the lamp housing or the spotlight and the like, act on the contact pins of the lamp, via which the lamp is connected to the lampholder 2 and therefore to the lamp housing via the lampholder mount 1, when there is no additional accommodating apparatus. Since these forces are both transmitted into the lamp interior and can result in impermissible stresses and a failure of the lamp, and also impair the electrical contact between the contact pins and the sockets 8, 9, the lamp power is reduced and there is the risk of premature failure of the lamp.

In order to reduce or eliminate the forces acting on the contact pins and to improve the way in which the lamp is held and clamped, an accommodating apparatus in the form of two clamping jaws 3, 4 is provided, which clamping jaws 3, 4 surround the lamp base axially with respect to one another at a distance and clamp it in a force-fitting and/or interlocking manner.

The upper clamping jaw 3 and the lower clamping jaw 4 are each connected to two lever arms 31, 32 and 41, 42, which are connected to one another at their ends opposite the clamping jaws 3, 4 via transverse webs 33, 43 and bear flat against the lampholder 2. Connecting rods 36, 46 are provided between the lever arms 31, 32 and 41, 42 of the upper and lower clamping jaw 3, 4 and parallel to the transverse webs 33, 43 and are connected to the lampholder mount 1 via spring-elastic supports.

As a result of the spring-mounting of the lever arms 31, 32 and 41, 42 and therefore of the clamping jaws 3, 4, in the event of a lamp movement brought about, for example, by means of impacts, the accommodating apparatus is also moved in the same plane, so that the contact pins of the lamp remain free from stresses. As a result of the lampholder 2 likewise being supported in elastic fashion via a spring-mounting with respect to the lampholder mount 1, it is ensured that no forces are transmitted to the contact pins of the lamp, so that the contact pins are used exclusively for transmitting the electrical power.

The upper and lower clamping jaws 3, 4 have a trapezoidal cutout, so that, in the clamped-in state of the lamp, the individual sides of the trapezoidal cutouts bear with point-to-point contact against the conventionally cylindrical lamp base.

An adjusting device 5 with an adjusting element 51, 52, which acts on the lever arms 31, 32 and 41, 42, and an adjusting spindle 7, which is connected to an actuating element, for manual actuation of the adjusting device 5 are used for adjusting the clamping jaws 3, 4 from an opening position, in which the lamp base is released for removal of the lamp, into a closing or locking position, in which the clamping jaws 3, 4 clamp in the lamp base and fix the lamp in its position.

Figure 2:
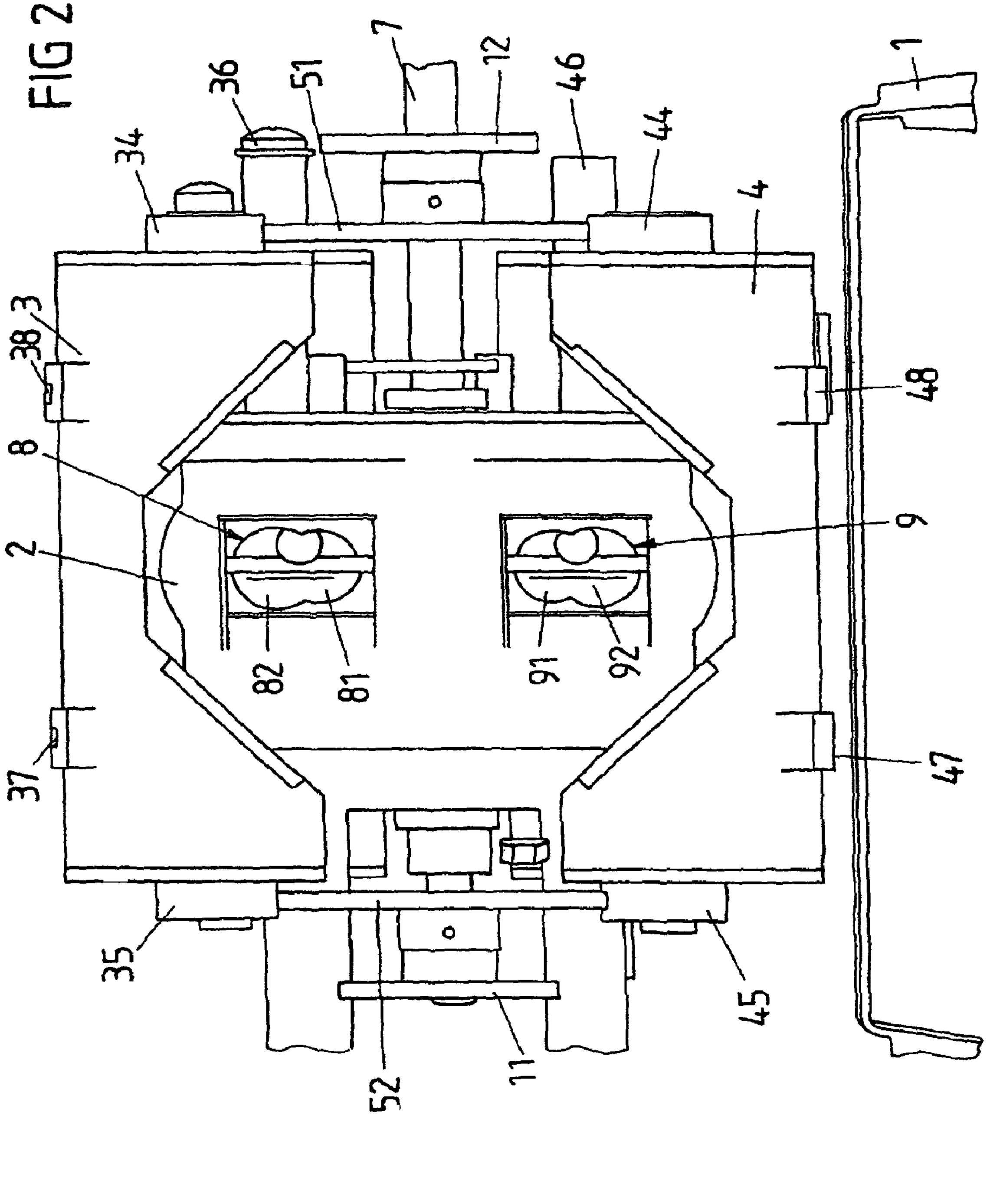
FIG. 2 shows a front view of the clamping jaws, lampholder and adjusting device as shown in FIG. 1.

The adjusting element comprises, as can be seen in particular in the front view shown in FIG. 2, ellipsoidal disks 51, 52, which are arranged on both sides of the lever arms 31, 32 and 41, 42 and whose peripheral rim interacts with bronze bearings 34, 35 and 44, 45. If the large axis of the ellipsoidal disk 51, 52 is located between the two bronze bearings 34, 44 and 35, 45, the lever arms 31, 32 and 41, 42 and therefore the upper and lower clamping jaw 3, 4 are moved apart from one another in order to remove or replace the lamp in the opening position. If, on the other hand, the small axis of the ellipsoidal disk 51, 52 is located between the two bronze bearings 34, 44 and 35, 45, the lever arms 31, 32 and 41, 42 and therefore the upper and lower clamping jaw 3, 4 are brought together so as to bear in a force-fitting and interlocking manner against the lamp base in the closing or locking position.

The actuating element comprises an adjusting spindle 7, which is guided through the center point of the ellipsoidal disks 51, 52 and through the lampholder 2 and is connected, in a manner not illustrated in any more detail, outside the spotlight housing to an adjusting lever or an adjusting knob for manual actuation of the adjusting device.

Figure 3:
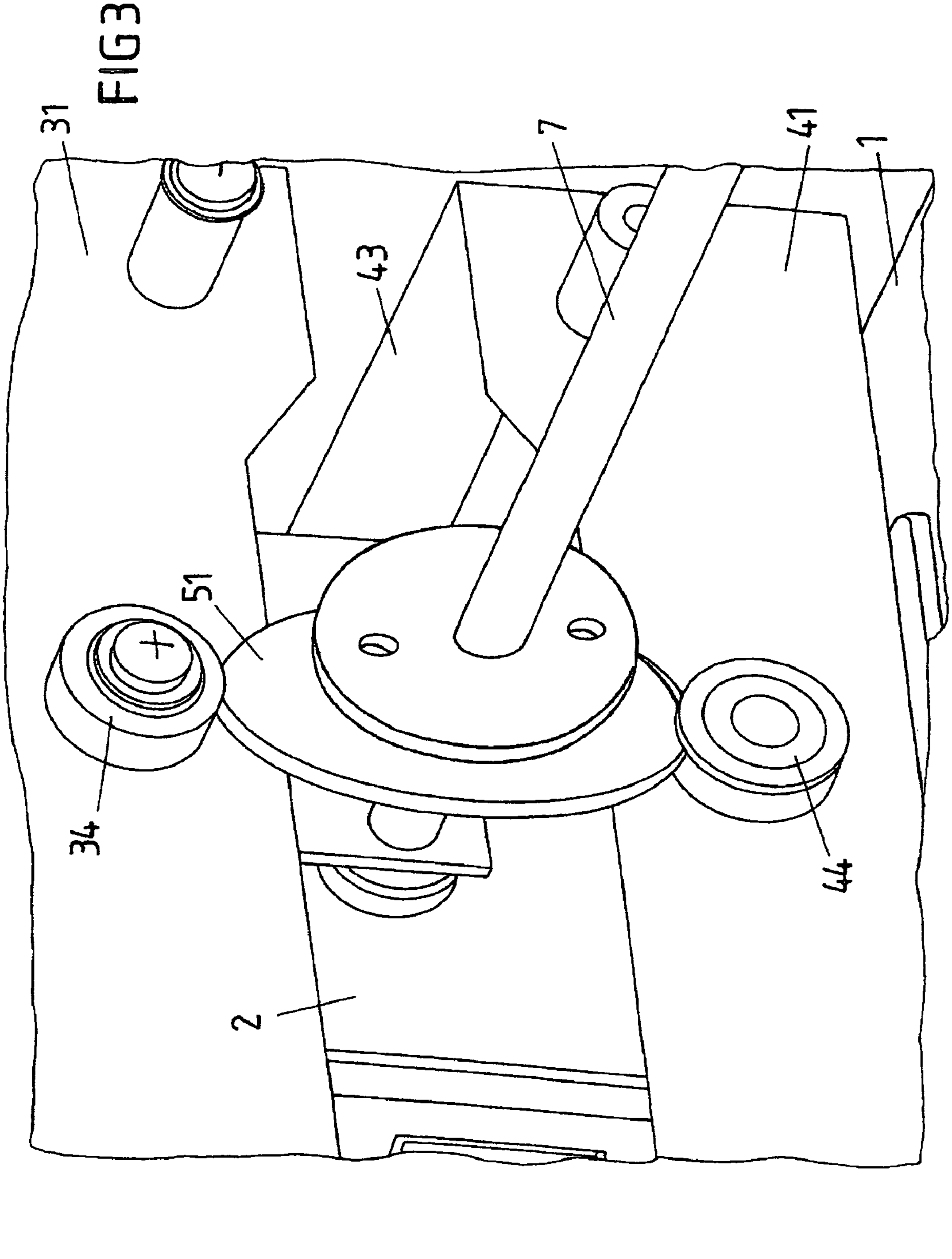
FIG. 3 shows an enlarged, perspective detail view of the adjusting device with an adjusting element in the form of an ellipsoidal disk.

In FIGS. 1 to 3, the adjusting element in the form of the ellipsoidal disk 51, 52 assumes a position in which the large ellipsoid axis is located between the bronze bearings 34, 44 and 35, 45 and therefore pushes the lever arms 31, 32 and 41, 42 and the upper and lower clamping jaw 3, 4 apart from one another into the opening position of the accommodating apparatus. In the event of a rotation of the adjusting spindle 7 through 90° , the small ellipsoid axis of the ellipsoidal disks 51, 52 is located between the bronze bearings 34, 44 and 35, 45, so that the lever arms 31, 41 and 32, 42 are brought together and therefore the clamping jaws 3, 4 are brought to bear in a force-fitting and interlocking manner against the lamp base of a lamp in their closing or locking position.

The enlarged detailed view shown in FIG. 3 shows that the bronze bearings 34, 44 are fastened to the lever arms 31, 41 via a screw-type bearing in a manner in which they are capable of rotary movement, so that, when the ellipsoidal disk 51 rotates, the bronze bearings 34, 44 can slide along the outer face of the ellipsoidal disk 51, as a result of which the sliding friction is reduced when the adjusting device is adjusted. Furthermore, this simple manner of fastening makes it possible to replace the bronze bearings 34, 44 easily.

As shown in FIG. 2, spring suspension means 37, 38 and 47, 48 on the outer rim of the clamping jaws 3, 4, which are connected to one another, for example, via tension springs and/or to the surrounding lamp housing via compression springs, are used for the spring prestress of the lever arms 31, 32 and 41, 42 and therefore the clamping jaws 3, 4 preferably into the closing or locking position of the clamping jaws 3, 4.

In addition or as an alternative, the transverse rods 36, 46, which run transversely between the lever arms 31, 32 of the upper clamping jaw 3 and the lever arms 41, 42 of the lower clamping jaw 4, can be connected to one another via compression springs or to the surrounding lamp housing via tension springs, so that a corresponding prestress of the accommodating apparatus into the closing or locking position of the clamping jaws 3, 4 is brought about.

As shown in FIG. 2, bearing disks 11, 12, which are supported, for example, in cooling plates in the interior of a spotlight or in corresponding bearing receptacles of the lamp housing, are used for laterally fixing the adjusting spindle 7.

The front view shown in FIG. 2 shows that the sockets 8, 9 for accommodating the contact pins of the lamp for the supply of current are in the form of twin bases or twin sockets and as a result are suitable for lamps with different lamp powers. For example, the contact pins of a 12 kW discharge lamp can be inserted into the socket contacts 81, 91, which are at a relatively small distance from one another, of the twin sockets 8, 9, while the contact pins of an 18 kW discharge lamp are inserted into the socket contacts 82, 92, which are further removed from one another, of the twin sockets 8, 9.

FIGS. 4 and 5 and 6 and 7 illustrate alternative adjusting devices for opening and closing the clamping jaws 3, 4, in which a roller bearing 6 is provided in kinematic reversal with respect to the previously described adjusting device with a cam disk or ellipsoidal disk as the adjusting element and supporting bearings which are capable of moving in rotary fashion on the lever arms, which roller bearing 6 has bearing rollers 61 to 64, which are capable of moving in rotary fashion, are connected to the adjusting spindle 7 via a roller mount 65, 66 and 67 and are arranged such that they can rotate about said spindle, whereas the support of the roller bearing 6 takes place on a smooth, rigid bearing surface 39, 49 of the lever arms 31, 32 and 41, 42. The bearing surface 39, 49 of the lever arms 31, 32 and 41, 42 can be realized by a tilted-out, angled metal sheet of the lever arms 31, 32 or 41, 42 or in such a way that the bearing rollers 61 to 64 bear against the lower edge of the upper lever arm 31, 32 or against the upper edge of the lower lever arm 41, 42. A stable bearing position is ensured, inter alia, by virtue of the fact that the width of the bearing rollers 61 to 64 is greater than the thickness of the lever arms 31, 32 and 41, 42.

Figure 4:
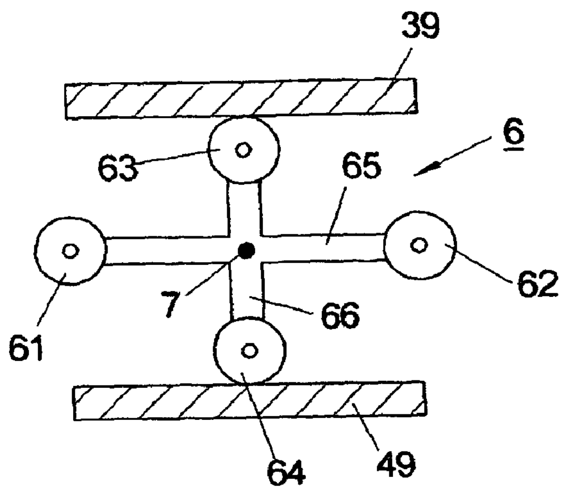
FIG. 4 shows a schematic illustration of an adjusting element in the form of a roller bearing with four bearing rollers in a closing position.

In the embodiment of the adjusting element illustrated in FIG. 4, the roller bearing 6 comprises two supporting arms 65, 66, which intersect one another at right angles and of which one supporting arm 65 is longer than the other supporting arm 66. The adjusting spindle 7 runs through the point of intersection of the supporting arms 65, 66, so that the roller bearing 6 is capable of rotating about the adjusting spindle 7. In the position of the roller bearing 6 illustrated in FIG. 4, the bearing rollers 63, 64, which are arranged at the ends of the short supporting arm 66, are located in the bearing position against the supports 39, 49 of the lever arms 31, 32 and 41, 42, in which the clamping jaws 3, 4 are closed.

As a result of the rotation of the roller bearing 6 through 90°, the bearing rollers 61, 62, which are arranged at the ends of the long supporting arm 65, come to bear against the supports 39, 49 of the lever arms 31, 32 and 41, 42 and push the lever arms 31, 32 and 41, 42 apart from one another, possibly counter to a spring prestress, and bring the clamping jaws 3, 4 into the opening position.

Figure 5:
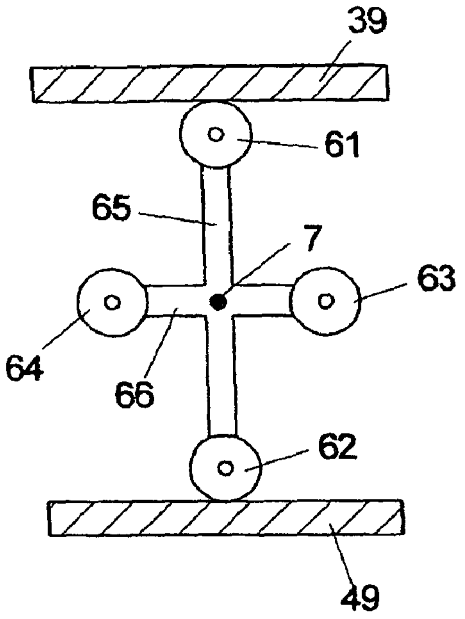
FIG. 5 shows a schematic illustration of an adjusting element in the form of a roller bearing with four bearing rollers in an opening position.

In a simplified embodiment of the roller bearing illustrated in FIGS. 4 and 5, only two bearing rollers 61, 62 are provided, which are arranged at the ends of a supporting arm, which is capable of rotating about the adjusting spindle 7, for example the supporting arm 65. In this embodiment, the clamping jaws 3, 4 are opened if the supporting arm 65 runs at right angles between the lever arms 31, 32 and 41, 42 and the bearing rollers 61, 62 bear against the lever arms 31, 32 and 41, 42. In a different position from this, for example a spring prestress of the lever arms 31, 32 and 41, 42 causes the clamping jaws 3, 4 to close, so that the supporting arm 65 is moved into a corresponding angled position with respect to the opening position of the clamping jaws 3, 4.

Figure 6:
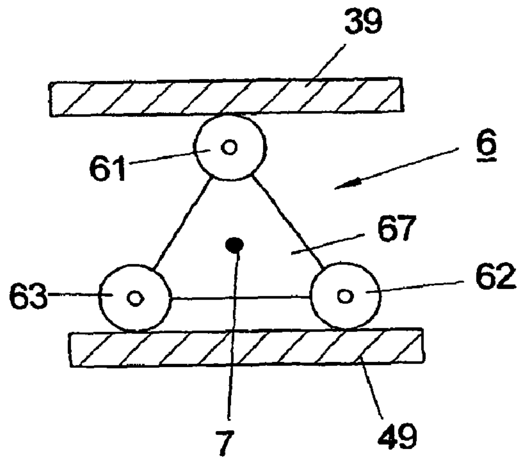
FIG. 6 shows a schematic illustration of a roller bearing with three bearing rollers arranged at the corners of a triangular roller mount in a closing position.
Figure 7:
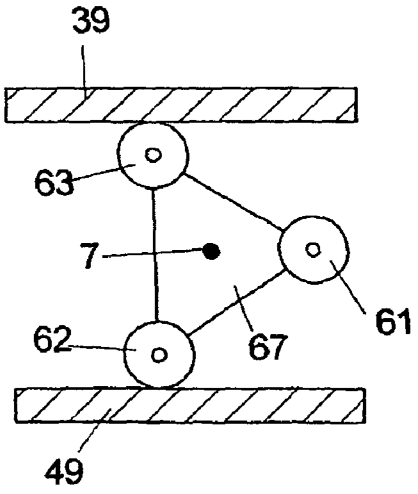
FIG. 7 shows a schematic illustration of a roller bearing with three bearing rollers arranged at the corners of a triangular roller mount in an opening position.

FIGS. 6 and 7 illustrate a further alternative of an adjusting element, which comprises bearing rollers 61 to 63, which are arranged at the corners of a roller mount 67 in the form of an equilateral triangle plate. In the closing position of the clamping jaws 3, 4 illustrated in FIG. 6, all three bearing rollers 61, 63 bear against the supports 39, 49 of the lever arms 31, 32 and 41, 42, whereas in the opening position of the clamping jaws 3, 4 illustrated in FIG. 7, the bearing rollers 62, 63, which are arranged on the base of the roller mount 67 in the form of an equilateral triangle plate, bear against the supports 39, 49 of the lever arms 31, 32 and 41, 42. By rotating the triangular mount plate 67 about the adjusting spindle 7, in each case the opening or closing position of the clamping jaws 3, 4 can be set.

Since the accommodating apparatus with the clamping jaws 3, 4 and the adjusting device with the ellipsoidal disks 51, 52 and bronze bearings 34, 44 and 35, 45 are intended and suitable for accommodating a wide range of diameters of lamp bases for discharge lamps, the lamp housing according to the invention is therefore suitable for accommodating lamps of different powers and different physical sizes without it being necessary to replace the lampholder mount 1 or the accommodating apparatus, which is connected to the lampholder mount 1.

The invention claimed is:

1. A lamp housing which comprises an accommodating apparatus for a burner or a lamp with a glass vessel, a lamp base and contact pins for supplying current, and a lampholder with sockets for connection to the contact pins, the accommodating apparatus comprising clamping jaws, which can be coupled to the lamp base, which engage at least partially around the lamp base, and which are articulated, via lever arms, on the lamp housing or a lampholder mount, which is connected to the lamp housing, and can be adjusted by means of an adjusting device, which has at least one adjusting element, which is arranged between the lever arms and pushes the lever arms apart from one another for opening the clamping jaws into an open position, in which the lamp base is released, and brings the lever arms together for closing the clamping jaws into a locking position, in which the lamp base is fixed, wherein the adjusting element is capable of rotating about an adjusting spindle and, with parts which are at different distances from the adjusting spindle and are arranged diametrically with respect to one another in relation to the adjusting spindle, bears against the lever arms.

2. The lamp housing of claim 1, wherein the adjusting spindle is connected to the adjusting element and an actuating element for the adjusting device for opening or closing the clamping jaws.

3. The lamp housing of claim 1, wherein the adjusting spindle extends at right angles to the longitudinal extent of the lever arms.

4. The lamp housing of claim 1, wherein the adjusting device pushes the lever arms, which are prestressed into the locking position of the clamping jaws, apart from one another counter to the prestress or brings them together in the direction of the prestress.

5. The lamp housing of claim 1, wherein the adjusting element comprises at least one cam disk, which acts with its peripheral rim on the lever arms.

6. The lamp housing of claim 5, wherein the cam disk has at least two axes of different lengths which are preferably at right angles with respect to one another.

7. The lamp housing of claim 6, wherein the cam disk comprises an ellipsoidal disk, which is preferably mounted centrally between the lever arms, and whose circumferential, peripheral rim is supported on bearings, which are connected to or formed on the lever arms.

8. The lamp housing of claim 7, wherein the bearings comprise bronze bearings in the form of circular disks.

9. The lamp housing of claim 8, wherein the bronze bearings in the form of circular disks are fastened to the lever arms in such a way that they can rotate.

10. The lamp housing of claim 5, wherein the adjusting spindle runs through the center of the cam disk or ellipsoidal disk.

11. The lamp housing of claim 5, wherein the adjusting spindle runs eccentrically through the cam disk or ellipsoidal disk.

12. The lamp housing of claim 1, wherein the adjusting element comprises a roller bearing, which acts on the lever arms and can rotate about the adjusting spindle.

13. The lamp housing of claim 12, wherein the roller bearing has at least two bearing rollers, which are spaced apart from one another, are arranged at the periphery of a roller mount, which is capable of rotating about the adjusting spindle, and are supported, when the clamping jaws are in the open or locking position on the lower or upper sides of the lever arms or on supports, which are formed on or connected to the lever arms.

14. The lamp housing of claim 13, wherein the roller bearing has two bearing rollers, which are arranged diametrically with respect to one another at ends of a roller mount, which is capable of rotating about the adjusting spindle, and, when the clamping jaws are in the open position, bear against the lever arms, which are prestressed in the closing direction of the clamping jaws.

15. The lamp housing of claim 14, wherein the roller bearing comprises four bearing rollers, wherein the roller mount comprises two supporting arms, which intersect one another at right angles and are of different lengths and whose point of intersection is connected to the adjusting spindle, the bearing rollers, which are arranged at the ends of the longer supporting arm, pushing the lever arms apart from one another for opening the clamping jaws, and the bearing rollers, which are arranged at the ends of the shorter supporting arm, bearing against the lever arms when the clamping jaws are in the locking position.

16. The lamp housing of claim 13, wherein the roller bearing comprises three bearing rollers, wherein the roller mount is in the form of an equilateral triangle, and in that the bearing rollers are arranged at the corners of the triangular roller mount.

17. The lamp housing of claim 1, wherein the actuating element, which is connected to the adjusting spindle, comprises an adjusting lever or adjusting knob, which is arranged on the outside of the lamp housing or within the lamp housing and in a depression of the lamp housing and is covered by a flap.

18. The lamp housing of claim 1, wherein the adjusting spindle or the actuating element is connected to a latching or locking device, which secures the opening or closing position of the clamping jaws.

19. The lamp housing of claim 1, wherein the lever arms are arranged on both sides of the lampholder and, at their front end, are connected to an upper and lower clamping jaw, and in that a cam disk or ellipsoidal disk is provided between the two lever arms, which are arranged on each side of the lampholder.

20. The lamp housing of claim 19, wherein cam disks or ellipsoidal disks are connected to the adjusting spindle, which is guided through the lampholder.

21. The lamp housing of claim 1, wherein the lever arms are connected to one another at their end opposite the clamping jaws via a transverse web.

22. The lamp housing of claim 1, wherein the lever arms are braced with one another via tension springs and/or compression springs.

23. The lamp housing of claim 22, wherein the lever arms are braced with one another via tension springs, which are arranged in the region of the clamping jaws between the lever arms.

24. The lamp housing of claim 22, wherein the clamping jaws and/or the lever arms are connected to the lamp housing or the lampholder mount, which is connected to the lamp housing, via compression springs.

25. The lamp housing of claim 1, wherein the lever arms are mounted at their ends opposite the clamping jaws on bearing rods, which are guided transversely with respect to the longitudinal extent of the lever arms and are supported on the lamp housing or on the lampholder mount.

26. The lamp housing of claim 1, wherein the actuating element is connected to a device for opening and closing sockets of a lampholder.

27. The lamp housing of claim 1, wherein the clamping jaws are designed to be polygonal and preferably have a trapezoidal cutout from a rectangular surface.

28. The lamp housing of claim 1, wherein the clamping jaws can be spread apart from one another in the direction of gravitation upwards and downwards.

29. The lamp housing of claim 1, wherein the clamping jaws are axially spaced apart from one another, accommodate the lamp base, and the lampholder is supported on the lamp housing in such a way that it is freely moveable.

30. The lamp housing of claim 29, wherein the lampholder is connected to the lampholder mount in spring-elastic fashion.

* * * * *